(12) United States Patent
Dustin et al.

(10) Patent No.: US 12,240,935 B1
(45) Date of Patent: Mar. 4, 2025

(54) CLOSED-LOOP THERMOSET POLYMERS WITH IMPROVED PROCESSIBILITY AND TUNABLE DEGRADATION

(71) Applicant: HRL Laboratories, LLC, Malibu, CA (US)

(72) Inventors: Ashley Dustin, Santa Monica, CA (US); Andrew Nowak, Los Angeles, CA (US); Jason Graetz, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 18/232,229

(22) Filed: Aug. 9, 2023

(51) Int. Cl.
*C08G 12/00* (2006.01)
*C08G 73/02* (2006.01)

(52) U.S. Cl.
CPC ......... *C08G 12/00* (2013.01); *C08G 73/0206* (2013.01)

(58) Field of Classification Search
None
See application file for complete search history.

(56) References Cited

U.S. PATENT DOCUMENTS

| | | | |
|---|---|---|---|
| 4,345,052 A | 8/1982 | Mumcu et al. | |
| 8,985,323 B2 * | 3/2015 | Ilfrey ................ | B65D 81/3266 206/219 |
| 11,713,370 B1 * | 8/2023 | Dustin ............... | C08G 18/3228 528/60 |

(Continued)

FOREIGN PATENT DOCUMENTS

| | | |
|---|---|---|
| WO | 2022187451 A1 | 9/2022 |
| WO | 2023287509 A1 | 1/2023 |

OTHER PUBLICATIONS

He et al., "Conformational Entropy as a Means to Control the Behavior of Poly(diketoenamine) Vitrimers In and Out of Equilibrium", Angew. Chem. Int. Ed. 2020, 59, 735-739.

(Continued)

*Primary Examiner* — Rachel Kahn
(74) *Attorney, Agent, or Firm* — O'Connor & Company; Ryan P. O'Connor

(57) ABSTRACT

The disclosed technology provides a vitrimeric poly(diketoenamine) network comprising: a plurality of multifunctional triketone dimers; a plurality of multifunctional amine species containing primary or secondary amine groups, but no tertiary amine groups; and optionally, one or more amine-reactive groups. The disclosed technology also provides a method of making a vitrimeric polymer network, comprising: obtaining multifunctional triketone dimers; obtaining a multifunctional imine compound, with imine groups blocking amine groups; mixing the multifunctional triketone dimers with the multifunctional imine compound, thereby forming a polymer precursor mixture; applying the polymer precursor mixture onto a substrate; and allowing the multifunctional imine compound to undergo hydrolysis with water, unblocking the amine functional groups and generating a multifunctional amine compound. The multifunctional amine compound reacts with the multifunctional triketone dimers to form a vitrimeric polymer network. The vitrimeric polymer network may be depolymerized back to monomers, which may be repolymerized in a closed-loop system.

10 Claims, 7 Drawing Sheets

(56) References Cited

U.S. PATENT DOCUMENTS

2020/0283415 A1* 9/2020 Helms ................ C07D 407/06

OTHER PUBLICATIONS

Christensen et al., "Closed-Loop Recycling of Plastics Enabled by Dynamic Covalent Diketoenamine Bonds", Nature chemistry, 11(5), May 1, 2019, DOI: 10.1038/s41557-019-0249-2, with Supplementary Information.
Winne et al., "Dynamic covalent chemistry in polymer networks: a mechanistic perspective", Polymer Chemistry vol. 10, Issue 45, Dec. 2019, pp. 6091-6108.
Dugas et al., "Diketoenamine-Based Vitrimers via Thiol-ene Photopolymerization", Macromol. Rapid Commun. 2022, 43, 2200249.
Demarteau et al., "Circularity in mixed-plastic chemical recycling enabled by variable rates of polydiketoenamine hydrolysis", Science Advances 8, eabp8823 (2022), with Supplementary Information.
Leone et al., "Dynamically Cross-Linked Polyolefins via Hydrogen Bonds: Tough yet Soft Thermoplastic Elastomers with High Elastic Recovery",ACS Appl. Polym. Mater., 2022, 4, 5; abstract.
Altuna et al., "Epoxy vitrimers incorporating physical crosslinks produced by self-association of alkyl chains", Polymer Chemistry 11, 7 (2020); abstract.
Written Opinion of the International Search Authority, PCT/US2023/031227, dated May 17, 2024.
Written Opinion of the International Search Authority, PCT/US2023/029919, dated May 1, 2024.

* cited by examiner

CLOSED-LOOP THERMOSET POLYMERS WITH IMPROVED PROCESSIBILITY AND TUNABLE DEGRADATION

FIELD OF THE INVENTION

The present invention generally relates to repairable closed-loop vitrimeric thermoset polymers, and methods of making and using vitrimeric thermoset polymers.

BACKGROUND OF THE INVENTION

Due to their mechanical properties, thermal stability, and resistance to chemicals and environmental stress, thermoset polymers have many applications, such as protective coatings and high-performance materials for aircraft, to name a few. Repairable and healable thermoset polymers are sought as these materials would enable intervention to restore material functionality. However, the inherent irreversible crosslinking in thermosets naturally restricts flow, bond exchange, and malleability, which limits reprocessing. Conventional thermoset polymers are therefore susceptible to failure after fracture or damage during service-reducing their environmental sustainability, safety, and lifetime.

Dynamic covalent adaptive networks have been introduced in thermoset materials, in order to enhance repairability via dissociative and associative exchange pathways. In the case of a dissociative dynamic covalent adaptive network, there is a step-by-step breaking and reforming of bonds, resulting in a substantial change in the macromolecular structure. By contrast, an associative dynamic covalent adaptive network displays a relatively fixed crosslink density during bond exchange, i.e., during breaking and reforming of bonds. Associative dynamic covalent bond exchanges result in a minimal change in macromolecular structure, due to the fixed crosslink density.

An associative dynamic covalent adaptive network may be referred to as a "vitrimer" which has a vitreous silica-like behavior. Vitrimers are a class of polymer glasses with exceptional material properties, combining the malleability, repairability, and recyclability of thermoplastics with the strong mechanical performance of thermosets. The unique processability of vitrimers arises from the reversible bond-exchange mechanism, which allows covalent crosslinks in the polymer network to change dynamically while preserving the total number of bonds. In effect, crosslinked (or thermoset) vitrimers behave like viscoelastic liquids at high temperatures and as crosslinked thermosets at low temperatures.

Whereas thermoplastic materials and dissociative covalent adaptive networks change their topology gradually while heating above the glass-transition temperature $T_g$, vitrimers have a temperature-dependent viscoelastic behavior caused by the dynamic (covalent) bonds. The viscosity changes as a function of covalent exchange rate. Due to the controlled viscosity, vitrimers allow processing in a wide temperature range without loss in network integrity, whereas thermoplastic materials and dissociative covalent adaptive networks exhibit a significant drop in viscosity as well as crosslink density while increasing the temperature. Thermoplastic polymers have a transition from solid to rubbery conventionally described by $T_g$. The viscoelastic phase transitions in vitrimers is termed the topology freezing-point temperature, $T_v$. For example, $T_v$ can be chosen as the temperature where the vitrimer viscosity reaches $10^{12}$ Pa·s. See Krishnakumar et al., "Vitrimers: Associative dynamic covalent adaptive networks in thermoset polymers", *Chemical Engineering Journal* 385 (2020) 123820, which is hereby incorporated by reference.

The remarkable associative covalent adaptive network formation of vitrimers is suitable for a variety of fields, including electronics, adhesives, repairable composites, coatings, long-life structures, and transport and defense applications, for example.

Recent advances in polymer science have identified a vitrimeric poly(diketoenamine) system capable of being depolymerized through exposure to strong aqueous acid. See Christensen et al., "Closed-loop recycling of plastics enabled by dynamic covalent diketoenamine bonds", *Nature Chemistry* Vol. 11, Pages 442-449 (2019), hereinafter referred to as "Helms", which is hereby incorporated by reference. Helms demonstrates the ability to reduce the polymer system to its original monomeric components that can then be recovered and repolymerized in a closed-loop system. However, a shortcoming of Helms is that the polymer network was broken down into its constituent parts through the use of strong aqueous acid at ambient conditions, which are conditions that may be encountered in the natural operating environment of automotive and aerospace composites or coatings, potentially resulting in part failure.

Helms utilized ball milling of a mixture of components, taking advantage of the rapid reaction kinetics of primary amines reacting with diketoenamines, but resulting in an intractable precipitated material within seconds. This very rapid reaction rate is another shortcoming of Helms. Processing via ball milling is limited in its ability to be scaled and applied to a variety of complex surfaces in a convenient manner.

Improvements to poly(diketoenamine) compositions and methods are desired in order to overcome the known processing limitations, to make the polymer recycling more efficient and convenient.

SUMMARY OF THE INVENTION

The present invention addresses the aforementioned needs in the art, as will now be summarized and then further described in detail below.

The disclosed technology provides a vitrimeric poly(diketoenamine) network comprising:
  (a) a plurality of multifunctional triketone dimers, or a reacted form thereof;
  (b) a plurality of multifunctional amine species, or a reacted form thereof, wherein the multifunctional amine species contains one or more primary amine groups and/or one or more secondary amine groups, and wherein the multifunctional amine species does not contain a tertiary amine group; and
  (c) optionally, one or more amine-reactive groups, or a reacted form thereof.

In some embodiments, the multifunctional triketone dimers have the structure:

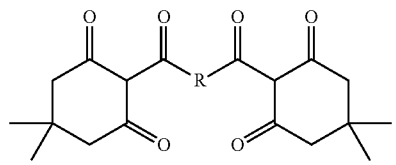

wherein R contains from 1 to 50 carbon atoms;
wherein R is a linear hydrocarbon group, a branched hydrocarbon group, a cyclic hydrocarbon group, or a combination thereof, and
wherein R contains carbon-carbon single bonds, carbon-carbon aromatic bonds, carbon-carbon double bonds, carbon-carbon triple bonds, or a combination thereof.

In some embodiments, R is a linear hydrocarbon group, such as one containing from 4 to 12 carbon atoms (e.g., 6, 8, or 10 carbon atoms).

In some embodiments, R is selected from benzene, naphthalene, or anthracene.

In some embodiments, R is a branched hydrocarbon group, and R is derived from an acid selected from the group consisting of citric acid, isocitric acid, aconitic acid, propane-1,2,3-tricarboxylic acid, agaric acid, trimesic acid, and combinations thereof.

In some embodiments, the multifunctional amine species has a functionality of at least 3, such as 3, 4, 5, or 6.

In certain embodiments, the multifunctional amine species has a functionality of 3, and the trifunctional amine species has the structure:

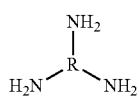

wherein R contains from 1 to 20 carbon atoms;
wherein R is a linear hydrocarbon group, a branched hydrocarbon group, a cyclic hydrocarbon group, or a combination thereof, and
wherein R contains carbon-carbon single bonds, carbon-carbon aromatic bonds, carbon-carbon double bonds, carbon-carbon triple bonds, or a combination thereof.

In certain embodiments, the multifunctional amine species is 4-(aminomethyl)octane-1,8-diamine.

In some embodiments, the multifunctional amine species has a functionality of 4. For example, the multifunctional amine species may be triethylenetetramine (TETA), with the following structure:

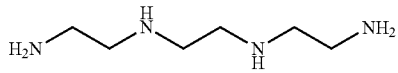

In some embodiments, the optional amine-reactive groups are present in the vitrimeric polymer network. The amine-reactive groups may be selected from epoxy groups, oxalate groups, isocyanate groups, or combinations thereof, for example.

The disclosed technology provides a vitrimeric-polymer packaged composition comprising:
(a) a multifunctional ketone compound (e.g., a triketone dimer);
(b) a multifunctional imine compound, wherein imine functional groups block amine functional groups;
(c) optionally, an amine-reactive compound; and
(d) optionally, one or more additives or fillers.

In some embodiments, all components are separated within a package. In other embodiments, all components are blended together within a package.

In some vitrimeric-polymer packaged compositions, the multifunctional ketone compound is a triketone dimer with the structure:

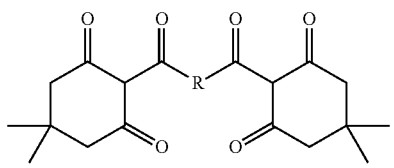

wherein R contains from 1 to 50 carbon atoms;
wherein R is a linear hydrocarbon group, a branched hydrocarbon group, a cyclic hydrocarbon group, or a combination thereof, and
wherein R contains carbon-carbon single bonds, carbon-carbon aromatic bonds, carbon-carbon double bonds, carbon-carbon triple bonds, or a combination thereof.

In some vitrimeric-polymer packaged compositions, R is a linear hydrocarbon group, and wherein R contains from 4 to 12 carbon atoms.

In some vitrimeric-polymer packaged compositions, R is selected from benzene, naphthalene, or anthracene.

In some vitrimeric-polymer packaged compositions, R is a branched hydrocarbon group, and R is derived from an acid selected from the group consisting of citric acid, isocitric acid, aconitic acid, propane-1,2,3-tricarboxylic acid, agaric acid, trimesic acid, and combinations thereof.

In some vitrimeric-polymer packaged compositions, the multifunctional imine compound does not contain a tertiary amine group.

In certain vitrimeric-polymer packaged compositions, the imine functional group blocks amine functional groups contained in the following structure:

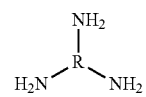

wherein R contains from 1 to 20 carbon atoms;
wherein R is a linear hydrocarbon group, a branched hydrocarbon group, a cyclic hydrocarbon group, or a combination thereof, and
wherein R contains carbon-carbon single bonds, carbon-carbon aromatic bonds, carbon-carbon double bonds, carbon-carbon triple bonds, or a combination thereof.

In certain vitrimeric-polymer packaged compositions, the multifunctional imine compound is MIBK-blocked 4-(aminomethyl)octane-1,8-diamine:

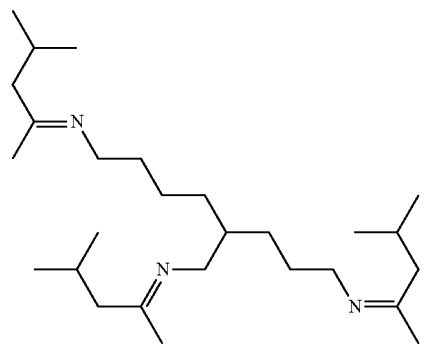 [SMILES: C/C(CC(C)C)=N/CCCC(CCCC/N=C(\C)CC(C)C)C/N=C(\C)CC(C)C]

The disclosed technology also provides a method of making a vitrimeric polymer network, the method comprising:

(a) obtaining a multifunctional ketone compound (e.g., a triketone dimer);
(b) obtaining a multifunctional imine compound, wherein imine functional groups block amine functional groups;
(c) optionally, obtaining an amine-reactive compound;
(d) optionally, obtaining one or more additives or fillers;
(e) mixing the multifunctional ketone compound with the multifunctional imine compound, with the amine-reactive compound if present, and with the additives or fillers if present, thereby forming a polymer precursor mixture;
(f) applying the polymer precursor mixture onto a substrate; and
(g) allowing the multifunctional imine compound to undergo hydrolysis with water, unblocking the amine functional groups and generating a multifunctional amine compound, wherein the multifunctional amine compound reacts with the multifunctional ketone compound to form a vitrimeric polymer network.

In some methods, the multifunctional ketone compound is a recycled multifunctional ketone compound, which may be a recycled polymer, a recycled oligomer, a recycled monomer, or a combination thereof.

In some methods, step (e) utilizes a solvent for forming the polymer precursor mixture.

In some methods, step (f) utilizes spraying the polymer precursor mixture onto the substrate. In these or other methods, step (f) utilizes casting the polymer precursor mixture onto the substrate.

In some methods, step (g) passively utilizes environmental humidity for the hydrolysis. In these or other methods, step (g) actively utilizes a source of humidity for the hydrolysis.

In some variations, the method further comprises depolymerizing the vitrimeric polymer network, thereby generating recycled vitrimeric monomers. Depolymerizing may be carried out using exposure of the vitrimeric polymer network to an aqueous acid, such as (but not limited to) hydrochloric acid, sulfuric acid, or a combination thereof. Alternatively, or additionally, depolymerizing is carried out using exposure of the vitrimeric polymer network to an organic solvent. The organic solvent may be selected from the group consisting of tetrahydrofuran, methyl ethyl ketone, methyl propyl ketone, methyl isobutyl ketone, acetone, diethyl ether, n-butyl acetate, toluene, benzene, xylenes, hexanes, methylene chloride, and combinations thereof. Alternatively, or additionally, depolymerizing is carried out using exposure of the vitrimeric polymer network to an elevated temperature, such as from about 30° C. to about 200° C., or from about 40° C. to about 100° C. In preferred embodiments, acid-catalyzed depolymerization is employed.

In some embodiments, the method further comprises depolymerizing the vitrimeric polymer network, wherein the depolymerizing is carried out using exposure of the vitrimeric polymer network to an aqueous acid as well as to an organic solvent.

In some embodiments, the method further comprises depolymerizing the vitrimeric polymer network, wherein the depolymerizing is carried out using exposure of the vitrimeric polymer network to an aqueous acid as well as to an elevated temperature.

In some embodiments, the method further comprises depolymerizing the vitrimeric polymer network, wherein the depolymerizing is carried out using exposure of the vitrimeric polymer network to an organic solvent as well as to an elevated temperature.

In some embodiments, the method further comprises depolymerizing the vitrimeric polymer network, wherein the depolymerizing is carried out using exposure of the vitrimeric polymer network to an aqueous acid, an organic solvent, and an elevated temperature.

The recycled vitrimeric monomers may form some or all of the multifunctional ketone in step (a). Steps (a) to (g) may be repeated multiple times in a closed loop.

A closed loop beneficially provides a system of closed-loop thermoset polymers with improved processability and tunable degradation.

DETAILED DESCRIPTION OF EMBODIMENTS OF THE INVENTION

Figure 1A:
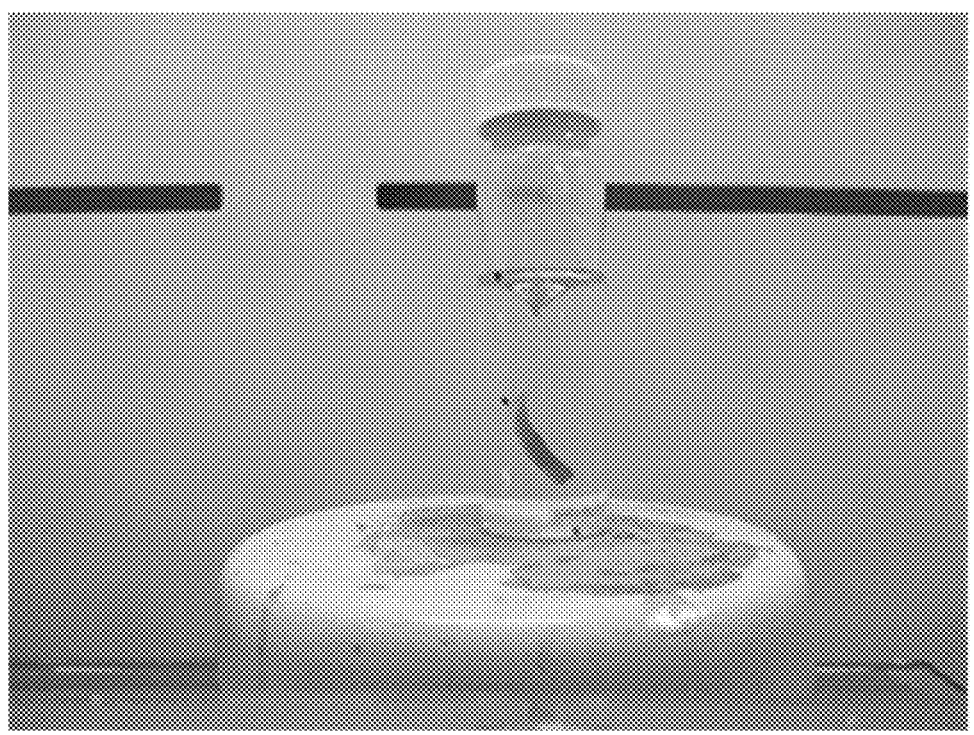
FIG. 1A shows a time-lapse photographic image of a polymeric network composed of Hexatran and TK-10 triketone dimer prepared from sebacic acid in pure aqueous acid (6 M HCl), at time 0, in Example 5.

The principles, structures, compositions, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

Unless otherwise stated, all molecular weights herein are number-average molecular weights, $M_n$.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

Variations of the present invention are predicated on the design of an improved closed-loop polymerization system. The disclosed polymerization system is capable of being polymerized, and then at an arbitrary later time, depolymerized with recovery of the depolymerized components, and finally repolymerization of the depolymerized components.

The present invention enhances the control of depolymerization, reducing or avoiding the possibility of breakdown conditions in materials that are installed in an operating environment. In some embodiments, the depolymerization mechanism is controlled using a mixture of organic solvent and an aqueous acid, along with the application of heat, which collectively are not breakdown conditions that would ordinarily be encountered during use. In particular, the breakdown conditions (e.g., the composition of the breakdown solution and/or the temperature of the breakdown) can be tuned based on polymer composition—e.g., increasing or decreasing hydrophilicity, hydrophobicity, crosslink density, etc. In some embodiments, polymer networks are identified that require more specific digestion media. The resulting polymer networks are more effective at excluding water alone and instead require a mixture of organic and aqueous acid conditions along with elevated temperature, or aqueous acid conditions with elevated temperature. Such conditions are advantageous for materials expected to be used in real-world automotive and aerospace applications, for example, making the materials more robust (less susceptible to unintentional degradation) to conditions that may be encountered in the natural operating environment.

The present invention also provides a conveniently castable or sprayable system, which is an improvement over the prior art. Some variations overcome prior processing challenges by employing monomers with controlled reactivity, using an imine-based blocking agent that prevents the intended reaction until moisture deblocks the amine-based monomers. This approach allows a mixture of monomers to be stable, even in blended form, in a closed container. Also, this approach enables polymer films to be conveniently sprayed or cast. In some embodiments, exposure to atmospheric humidity gracefully allows for reaction and curing of the sprayed or cast polymer network.

Applications for the disclosed technology generally include renewable and sustainable materials and composites. Specific applications include, but are not limited to, thermoprocessable materials for automotive or aerospace cabin interiors; and filled thermoset protective coatings that can be cleanly recycled down to individual monomers in a closed-loop manner, including separation of additives or fillers.

The disclosed technology provides a vitrimeric poly(diketoenamine) network comprising:
  (a) a plurality of multifunctional triketone dimers, or a reacted form thereof;
  (b) a plurality of multifunctional amine species, or a reacted form thereof, wherein the multifunctional amine species contains one or more primary amine groups and/or one or more secondary amine groups, and wherein the multifunctional amine species does not contain a tertiary amine group; and
  (c) optionally, one or more amine-reactive groups, or a reacted form thereof.

In this specification, a "polymer" means there are at least 2 repeat units in the chain, such as from 2 to 1000 or more. In various embodiments, the number of repeat units in the vitrimeric polymer network is at least, or at most, 2, 3, 4, 5, 6, 7, 8, 9, 10, 25, 50, 100, 150, 200, 250, 300, 400, 500, 600, 700, 800, 900, or 1000, including any intervening range.

A vitrimeric polymer network contains dynamic bonds. In this specification, "dynamic bonding", "dynamic bonds", and the like refer to bonds which can undergo crosslink exchange through one-step exchange reactions. Bond breakage and reformation occur at essentially equal rates with transient presence of an intermediate. A "dynamic species" or equivalently a "dynamic-bonded species" is a species that contains at least one dynamic bond. "Non-dynamic bonding", "non-dynamic bonds", and the like refer to bonds which can undergo crosslink exchange only through multiple-step reactions. Bond breakage and reformation generally occur at different rates and there is significant presence of one or more intermediates. A "non-dynamic species" or equivalently a "non-dynamic-bonded species" is a species that contains no dynamic bonds. See Jin et al., "Malleable and Recyclable Thermosets: The Next Generation of Plastics", *Matter* 1, 1456-1493, Dec. 4, 2019, which is hereby incorporated by reference.

A "plurality of multifunctional triketone dimers" means that there are multiple instances of a multifunctional triketone dimer owing to the fact that there are multiple repeat units in the polymer. As the number of repeat units increases, the number of multifunctional triketone dimer also increases. In some embodiments, when there are n repeat units in the vitrimeric polymer network, there are n total multifunctional triketone dimers, one in each repeat unit. A plurality here does not mean that there are two or more different types of multifunctional triketone dimers present in the polymer, although that is possible.

Likewise, a "plurality of multifunctional amine species" means that there are multiple instances of a multifunctional amine species owing to the fact that there are multiple repeat units in the polymer. As the number of repeat units increases, the number of multifunctional amine species also increases. A plurality here does not mean that there are two or more different types of multifunctional amine species present in the polymer, although that is possible.

A "reacted form" of the multifunctional triketone dimers means that the multifunctional triketone dimers have reacted, at least to some extent, with the multifunctional amine species, to form a plurality of multifunctional ketoenamine species, such as diketoenamine dimers. A "reacted form" of the multifunctional amine species means that those amine species have reacted, at least to some extent, with the multifunctional triketone dimers, to form a plurality of multifunctional ketoenamine species, such as diketoenamine dimers.

The vitrimeric poly(diketoenamine) network may be present in various states of reversible reaction. Initially, there may be multifunctional triketone dimers and multifunctional amine species that have not yet reacted with each other. After a period of reaction time, the multifunctional triketone dimers and the multifunctional amine species react with each other to form multifunctional diketoenamine dimers. In the case of complete reaction (100% conversion), there would only be a reacted form of the multifunctional triketone dimers and a reacted form of the multifunctional amine species, which collectively would be multifunctional diketoenamine dimers. In the case of an intermediate conversion (between 0% and 100%), and/or after some amount of reverse reaction (such as via closed-loop processing), there would be multifunctional triketone dimers as well as a reacted form thereof, and there would also be multifunctional amine species and a reacted form thereof.

After partial or complete conversion, there will be a "plurality of multifunctional diketoenamine dimers" which means that there are multiple instances of a multifunctional diketoenamine dimer owing to the fact that there are multiple repeat units in the polymer. As the number of repeat units increases, the number of multifunctional diketoenamine dimers also increases. In some embodiments, when there are n repeat units in the vitrimeric polymer network, there are n total multifunctional diketoenamine dimers, one in each repeat unit. A plurality here does not mean that there are two or more different types of multifunctional diketoenamine dimers present in the polymer, although that is possible.

In some embodiments, the multifunctional ketoenamine species is derived from a multifunctional triketone dimer compound having the structure:

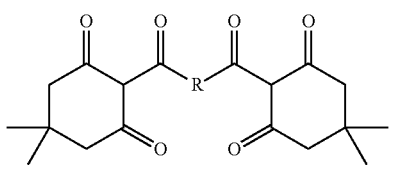

wherein R contains from 1 to 50 carbon atoms;
wherein R is a linear hydrocarbon group, a branched hydrocarbon group, a cyclic hydrocarbon group, or a combination thereof; and
wherein R contains carbon-carbon single bonds, carbon-carbon aromatic bonds, carbon-carbon double bonds, carbon-carbon triple bonds, or a combination thereof.

In this specification, a "triketone dimer" (or equivalently, a "bis-triketone") is a molecule that contains two identical triketone groups, and also contains a non-symmetrical group, such as the internal R group shown above (there are not two instances of the R group). Each triketone group contains three ketone functional groups, which are carbonyl groups (C=O) in which the C in the carbonyl group is bonded to two other C atoms.

A multifunctional ketoenamine species is derived from the above multifunctional triketone dimer by chemically converting at least two ketone groups (C—C=O) to ketoenamine groups (C=C—N), upon exposure of the multifunctional triketone dimer to amine and/or imine functional groups. Typically, in the case of the above structure, the two C=O groups that are adjacent to the interior R group are converted to ketoenamine groups, while the four C=O groups attached to the cyclohexane rings are not converted to ketoenamine groups. Depending on the chemical conditions, a small amount of the four C=O groups attached to the cyclohexane rings may also be converted to ketoenamine groups, which would also convert the cyclohexane ring into a cyclohexene, 1,3-cyclohexadiene, and/or 1,4-cyclohexadiene ring. A related multifunctional ketone compound omits some or all of the four C=O groups attached to the cyclohexane rings, in which case the ketone dimer is not a triketone dimer but rather may be a diketone dimer or a monoketone dimer, for example.

In some embodiments, R is an aliphatic or aromatic linear species comprised of $(CH_2)_n$ wherein n=1 to 50. In various embodiments, n is 1, 2, 3, 4, 5, 6, 7, 8, 9, 10, 15, 20, 25, 30, 35, 40, 45, or 50.

In some embodiments, R is a linear aliphatic hydrocarbon group, such as one containing from 4 to 12 carbon atoms (e.g., 6, 8, or 10 carbon atoms).

In some embodiments, R is a linear aromatic hydrocarbon group, such as one containing from 6 to 14 carbon atoms (e.g., 6, 10, or 14 carbon atoms). A "linear aromatic hydrocarbon group" is one in which the aromatic group is contained within the main chain of R, rather than being contained in side groups or branches from a main chain. In certain embodiments, R is selected from benzene, naphthalene, or anthracene.

In some embodiments, R is generally an aromatic hydrocarbon species, such as one containing from 6 to 24 carbon atoms. Note that a cyclic species requires that R contain at least three carbon atoms (e.g., cyclopropenium), and usually at least 6 carbon atoms (e.g., benzene). Also, the aromatic portion of an R group may be contained internally. An example is benzene with propyl groups on each end, so that R has 12 carbons, 6 of which are linear and 6 of which are aromatic.

In some embodiments, R is a branched species with two or more branches or arms. Note that a branched species requires that R contain at least two carbon atoms. In certain embodiments, R is a branched species with three or more branches or arms. In some embodiments pertaining to branched versions of R, R is derived from an acid selected from the group consisting of citric acid, isocitric acid, aconitic acid, propane-1,2,3-tricarboxylic acid, agaric acid, trimesic acid, and combinations thereof. In the case of citric acid, for example, citric acid is trifunctional with three carboxylic acid groups. In the multifunctional triketone dimer compound, the two C=O groups adjacent to R are C=O groups from two of the carboxylic acid groups in the citric acid, while the R group itself contains the remaining C=O group from the citric acid (i.e., such remaining C=O group is part of R itself).

In some embodiments, R is a cyclic aliphatic hydrocarbon group, such as one containing from 4 to 12 carbon atoms. Note that a cyclic species requires that R contain at least three carbon atoms. Also, the cyclic portion of an R group may be contained internally. An example is cyclohexane with butyl groups on each end, so that R has 14 carbons, 8 of which are linear and 6 of which are cyclic.

The multifunctional amine species has a functionality of at least 2, i.e., at least two amine (—NH$_2$) groups per molecule. In some embodiments, the multifunctional amine species is selected from the group consisting of ethylenediamine, 1,3-propanediamine, 1,4-butanediamine, diethyltoluenediamine, dimethylthiotoluenediamine, isophoronediamine, diaminocyclohexane, N,N,N',N'-tetrakis(2-hydroxypropyl)ethylenediamine, and homologues, derivatives, or combinations thereof.

In some embodiments, the multifunctional amine species has a functionality of at least 3, such as 3, 4, 5, or 6. In certain embodiments, the multifunctional amine species has a functionality of 3. For example, the multifunctional amine species may be selected from the group consisting of 4-(aminomethyl)octane-1,8-diamine, 4-(aminoethyl)octane-1,8-diamine, 4-(aminopropyl)octane-1,8-diamine, 4-(aminomethyl)heptane-1,7-diamine, 4-(aminomethyl)hexane-1,6-diamine, 4-(aminomethyl)pentane-1,5-diamine, 2-(aminomethyl)octane-1,8-diamine, 3-(aminomethyl)octane-1,8-diamine, N-(hydroxyethyl)diethylenetriamine, and derivatives or combinations thereof. An example of a multifunctional amine species with a functionality of 4 is tetraethylenetetramine. An example of a multifunctional amine species with a functionality of 5 is tetraethylenepentamine.

When there are multiple types of multifunctional amine species present, the average functionality of the multifunctional amine species is at least 2, and may be at least 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, In certain embodiments, the multifunctional amine species has a functionality of 3 with the trifunctional structure:

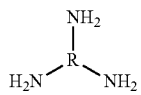

wherein R contains from 1 to 20 carbon atoms;
wherein R is a linear hydrocarbon group, a branched hydrocarbon group, a cyclic hydrocarbon group, or a combination thereof; and
wherein R contains carbon-carbon single bonds, carbon-carbon aromatic bonds, carbon-carbon double bonds, carbon-carbon triple bonds, or a combination thereof. Typically, the R group in R(NH$_2$)$_3$ is linear aliphatic or linear aromatic.

In certain embodiments, the multifunctional amine species is 4-(aminomethyl)octane-1,8-diamine, with the following structure (this species contains a tertiary carbon center):

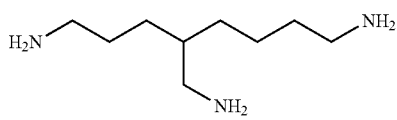 [SMILES: NCCCCC(CN)CCCN]

In some embodiments, a vitrimeric polymer network comprises:
(a) a plurality of multifunctional triketone dimers, or a reacted form thereof,
(b) a plurality of multifunctional amine species, or a reacted form thereof, wherein the multifunctional amine species contains one or more primary amine groups and/or one or more secondary amine groups, wherein the multifunctional amine species contains at least one tertiary carbon center, and wherein optionally the multifunctional amine species does not contain a tertiary amine group; and
(c) optionally, one or more amine-reactive groups, or a reacted form thereof.

In some embodiments, the multifunctional amine species has a functionality of 4. For example, the multifunctional amine species may be triethylenetetramine (TETA), with the following structure:

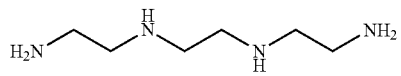

In some embodiments, the optional amine-reactive groups are present in the vitrimeric polymer network. "Amine-reactive groups" mean functional groups that are reactive with amine groups. In some embodiments, the amine-reactive groups are partially or completely reacted with amine groups present. The amine-reactive groups may be selected from epoxy groups, oxalate groups, isocyanate groups, or combinations thereof, for example.

When the amine-reactive groups are epoxy groups, the epoxy groups may be provided by ethylene oxide, benzene oxide, glycidol (epoxypropyl alcohol), bisphenol A diglycidyl ether, 3,4-epoxycyclohexylmethyl-3',4'-epoxycyclohexane carboxylate, or a combination or derivative thereof, for example.

When the amine-reactive groups are oxalate groups, the oxalate groups may be provided by oxalic acid, dimethyl oxalate, diethyl oxalate, dipropyl oxalate, dicyclohexyl oxalate, dibenzyl oxalate, an oxalate salt (e.g., sodium oxalate or zinc oxalate), or a combination or derivative thereof, for example.

When the amine-reactive groups are isocyanate groups, the isocyanate groups may be provided by 4,4'-methylenebis (cyclohexyl isocyanate), hexamethylene diisocyanate, cycloalkyl-based diisocyanates, tolylene-2,4-diisocyanate, 4,4'-methylenebis(phenyl isocyanate), isophorone diisocyanate, or a combination or derivative thereof, for example.

In some embodiments, such as but not limited to those employing 4-(aminomethyl)octane-1,8-diamine, the multifunctional amine species contains at least one tertiary carbon center. As noted above, the multifunctional amine species preferably does not contain a tertiary amine group. In certain embodiments of the invention, a multifunctional amine species containing a tertiary amine group is replaced with a multifunctional amine species containing a tertiary carbon center. The tertiary carbon center may be at the same molecular location as the tertiary amine group, or at a different molecular location.

Helms describes a polymeric network created from the reaction of triketone species and aliphatic or aromatic polyamines. The polyamine used was tris(2-aminoethylamine) ("TREN"), a polyamine with three primary aliphatic amines, a central tertiary amine, and no tertiary carbon center. This central tertiary amine is hygroscopic, particularly in acidic environments, through the formation of a charged salt species. This mechanism is believed to cause rapid degradation of the network in strong acids at room temperature. The network is therefore susceptible to acidic environments over time, such as those that might be found in an ambient-temperature operational environment of automotive or aerospace vehicles. The present inventors have discovered that the Helms network is improved upon by replacing the TREN monomer with one or more of the disclosed multifunctional amine species—e.g., an aliphatic triamine species, such as Hexatran® triamine compound.

Hexatran® triamine compound (or homologues thereof) is beneficial because it contains three primary amines, allowing for a highly crosslinked network upon reaction with triketone species. This triamine molecule eliminates the tertiary amine species that is in the center of the TREN molecule. The tertiary amine group is hygroscopic due to the fact that it creates a hydrochloride salt species in an acidic environment. Without being limited by theory, it is believed that the use of a triamine molecule with a tertiary amine species increases penetration of water into the network, causing rapid breakdown of the material. Removal of the tertiary amine species group, such as (but not limited to) by instead using an aliphatic triamine species, makes the network more hydrophobic and better able to exclude water and the acidic species that promote decomposition of the material. The disclosed materials and conditions are more attractive for real-world automotive and aerospace applications, by making the materials more robust to natural operating environments and more selective to depolymerization when that is desired for recycling.

In some embodiments, one or more additives or fillers are included in the vitrimeric polymer network. Additives or fillers may be used for a wide variety of reasons, ranging from improving mechanical properties (e.g., strength-enhancing nanoparticles), to reducing overall cost (e.g., inert fillers such as silica), to providing certain colors (e.g., pigments). Additives or fillers may be selected from the group consisting of toughening particles (e.g., polypropylene, polyethylene, or an ethylene-propylene copolymer), transparency-modifying particles, refractive index-modifying particles (e.g., high-refractive-index nanoparticles), flame-retardant particles, and combinations thereof. In some embodiments, additives or fillers are selected from the group consisting of Ge, $CaF_2$, NaCl, KCl, KBr, diamond, Si, CsI, MgO, $MgF_2$, LiF, NaF, $BaF_2$, ZnS, ZnSe, PbS, PbSe, $PbF_2$, $LiYF_4$, $NaYF_4$, ThBrI, ThBrCl, Si, SiC, Ge, GaAs, AlN, AlON, $Al_2O_3$, polyethylene, polypropylene, and combinations thereof. Organic or inorganic pigments may be incorporated. Multiple types of additives or filler particles may be present.

In certain embodiments, additive or filler particles are high-refractive-index nanoparticles selected from the group consisting of titanium dioxide, silicon, germanium, zinc oxide, silicon carbide, silicon dioxide, hafnium oxide, zinc selenide, zinc sulfide, sapphire, calcium fluoride, sodium fluoride, lithium fluoride, cesium fluoride, cesium bromide, potassium bromide, potassium iodide, and combinations thereof.

The additive or filler particles may vary widely in particle size. In some embodiments, the additive or filler particles have an average particle size from about 5 nanometers to about 100 microns, such as from about 10 nanometers to about 10 microns. The average particle size is the average diameter in the case of spherical particles and the average effective diameter in the case of non-spherical particles.

In this disclosure, particles sizes may be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Dynamic light scattering is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images.

The additive or filler particles may be in the form of spheres, rods, whiskers, platelets, or a combination thereof, for example. The filler particles may have a spherical geometry or they may have a geometric aspect ratio greater than 1 along one or more Cartesian axes (e.g. rods, whiskers, or platelets).

In some embodiments, the additive or filler particles (when present) have an average volumetric loading from about 1 vol % to about 10 vol % based on volume of the thermoset vitrimer plus volume of the filler particles, for example. In various embodiments, the average volumetric loading of the filler particles is about, or at most about 0.1, 0.5, 1, 2, 3, 4, 5, 10, 15, 20, or 25 vol %.

The additive or filler particles (when present) may be selected based upon their ability to toughen the underlying polymer matrix by means of crack tip blunting (reduced stress intensity factor), crack tip deflection (increased crack path length), or formation of local elastic heterogeneities that impose a residual compressive stress state around the fillers, or for other reasons, for example.

The disclosed technology also provides a vitrimeric-polymer packaged composition comprising:
(a) a multifunctional ketone compound, such as a triketone dimer;
(b) a multifunctional imine compound, wherein imine functional groups (in the multifunctional imine compound) block amine functional groups;
(c) optionally, an amine-reactive compound; and
(d) optionally, one or more additives or fillers.

As mentioned previously, the blocking of amine functional groups using imines prevents reaction until moisture deblocks the amine-based monomers. The controlled reactivity allows a mixture of monomers to be stable, even in blended form, in a closed container (i.e., the vitrimeric-polymer packaged composition). Imines are the nitrogen analogues of aldehydes and ketones, containing a C=N bond instead of a C=O bond. Imines can be formed through the addition of a primary amine to an aldehyde or ketone, also producing $H_2O$. The reaction is reversible, so that when water is exposed to the imine functional group, the imine group is converted back to an amine group. In other words, the blocking of amine functional groups is reversible and controllable by exposing the material to water (e.g., humidity), or by avoiding exposure to water (e.g., a dry container). For this reason, the imine functional groups are preferably moisture-labile imine groups, which means that they are readily converted back to amine functional groups (i.e., unblocked) by water moisture.

The multifunctional imine compound may contain one or more primary imine groups and/or one or more secondary imine groups. Tertiary imine groups are not ordinarily possible. The multifunctional imine compound preferably does not contain a tertiary amine group, which would not be blocked by the intended mechanism.

In some embodiments, all components are separated within a package. For example, the package may include multiple individual containers (e.g., bottles) that each have one component. In other embodiments, all components are blended together within a package, such as within a single bottle (which may be situated within a package, e.g. a box, or may itself be regarded as the package). A combination of the foregoing options is possible. For example, within the package, one container may contain several components, while another container contains a single component. The package may include instructions for carrying out chemical synthesis using the individual components, and instructions for using the vitrimeric polymer network made via synthesis. The package may also be referred to as a "kit" configured for carrying out chemical synthesis to make and use a vitrimeric polymer network.

In some vitrimeric-polymer packaged compositions, the multifunctional ketone compound is a triketone dimer with the structure:

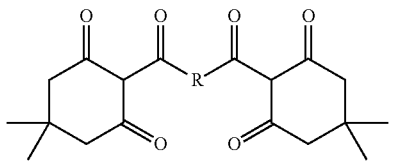

wherein R contains from 1 to 50 carbon atoms;

wherein R is a linear hydrocarbon group, a branched hydrocarbon group, a cyclic hydrocarbon group, or a combination thereof; and wherein R contains carbon-carbon single bonds, carbon-carbon aromatic bonds, carbon-carbon double bonds, carbon-carbon triple bonds, or a combination thereof.

In some vitrimeric-polymer packaged compositions, R is a linear hydrocarbon group, and wherein R contains from 4 to 12 carbon atoms.

In some vitrimeric-polymer packaged compositions, R is selected from benzene, naphthalene, or anthracene.

In some vitrimeric-polymer packaged compositions utilizing branched versions of R, R is derived from an acid selected from the group consisting of citric acid, isocitric acid, aconitic acid, propane-1,2,3-tricarboxylic acid, agaric acid, trimesic acid, and combinations thereof.

In some vitrimeric-polymer packaged compositions, the multifunctional imine compound does not contain a tertiary amine group.

In certain vitrimeric-polymer packaged compositions, the imine functional groups block amine functional groups contained in the following structure:

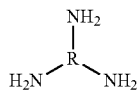

wherein R contains from 1 to 20 carbon atoms;

wherein R is a linear hydrocarbon group, a branched hydrocarbon group, a cyclic hydrocarbon group, or a combination thereof; and wherein R contains carbon-carbon single bonds, carbon-carbon aromatic bonds, carbon-carbon double bonds, carbon-carbon triple bonds, or a combination thereof.

In certain vitrimeric-polymer packaged compositions, the multifunctional imine compound is MIBK-blocked 4-(aminomethyl)octane-1,8-diamine:

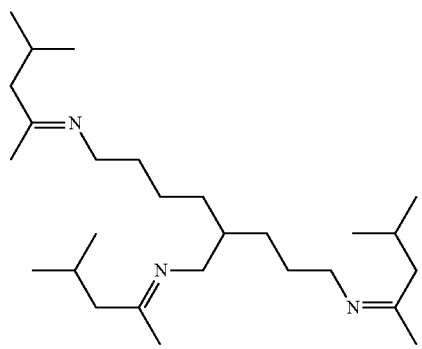 [SMILES: C/C(CC(C)C)=N/CCCC(CCCC/N=C(\C)CC(C)C)C/N=C(\C)CC(C)C]

In certain embodiments, recycling back to monomer is not complete, so there remains a mixture of ketoenamine bonds (e.g., within diketoenamine dimers) as well as functional ketone bonds (e.g., within triketone dimers). In these embodiments, the functional ketone bonds are ultimately converted to additional ketoenamine bonds besides the starting ketoenamine bonds. In these embodiments, a vitrimeric-polymer packaged composition may comprise:

(a) a mixture of a multifunctional triketone dimer and a diketoenamine dimer;
(b) a multifunctional imine compound, wherein imine functional groups block amine functional groups;
(c) optionally, an amine-reactive compound; and
(d) optionally, one or more additives or fillers.

The disclosed technology also provides a method of making a vitrimeric polymer network, the method comprising:

(a) obtaining a multifunctional ketone compound, such as a triketone dimer;
(b) obtaining a multifunctional imine compound, wherein imine functional groups block amine functional groups;
(c) optionally, obtaining an amine-reactive compound;
(d) optionally, obtaining one or more additives or fillers;
(e) mixing the multifunctional ketone compound with the multifunctional imine compound, with the amine-reactive compound if present, and with the additives or fillers if present, thereby forming a polymer precursor mixture;
(f) applying the polymer precursor mixture onto a substrate; and
(g) allowing the multifunctional imine compound to undergo hydrolysis with water, unblocking the amine functional groups and generating a multifunctional amine compound, wherein the multifunctional amine compound reacts with the multifunctional ketone (e.g., triketone dimers) compound to form a vitrimeric polymer network (e.g., containing diketoenamine dimers).

Heating or cooling may be applied to one or more method steps (a) to (g), between any of steps (a) to (g), or after step (g). For example, after step (g), the vitrimeric polymer network may be heated beyond room temperature (about 25° C.), such as to a temperature from about 30° C. to about 200° C.

In some methods, the multifunctional ketone compound is a recycled multifunctional ketone compound, which may be a recycled polymer, a recycled oligomer, a recycled monomer, or a combination thereof.

In some methods, step (e) utilizes a solvent for forming the polymer precursor mixture. The optional solvent in step (e) may be selected from the group consisting of tetrahydrofuran, methyl ethyl ketone, methyl propyl ketone, methyl isobutyl ketone, acetone, diethyl ether, n-butyl acetate, toluene, benzene, xylenes, hexanes, methylene chloride, and combinations thereof, for example. "Xylenes" include m-xylene, o-xylene, and p-xylene.

In some methods, step (e) is conducted substantially in the absence of water, so that the amine functional groups remain blocked as imine functional groups. Traces of water may be present, or there may be a complete absence of water. In these methods, the unblocking of amine functional groups occurs in step (g), in which there is hydrolysis of imine groups back to amine groups.

In other methods, step (e) includes some water, either in a liquid phase (e.g., along with a solvent such as THF) or water introduced from environmental humidity. Such water may unblock a portion of the amine functional groups, by hydrolyzing imine groups back to amine groups. It is preferred not to unblock all of the amine functional groups in step (e), and instead unblock the remainder of the amine functional groups in step (g), so that the chemistry can be better controlled. If there is some unblocking in step (e), then there also may be some amount of ketone conversion to ketoenamine in that step, since primary amines become available for reaction.

Step (e) may be conducted at various temperatures, such as from about 0° C. to about 50° C., or from about 20° C. to about 30° C. (e.g., room temperature, about 25° C.). The mixing time in step (e) may vary widely, such as from about 1 minute to about 24 hours, and is not regarded as critical as long as the components become well-mixed. Various types of mixing may be employed, including (but not limited to) agitation using an impeller or magnetic stir bar, sonication, vessel rotation or vibration, liquid recirculation, or simple diffusion.

In some methods, step (f) utilizes spraying the polymer precursor mixture onto the substrate. Spraying, or spray coating, in step (f) may employ a solvent, such as a solvent selected from the group consisting of tetrahydrofuran, methyl ethyl ketone, methyl propyl ketone, methyl isobutyl ketone, acetone, diethyl ether, n-butyl acetate, toluene, benzene, xylenes, hexanes, methylene chloride, and combinations thereof, for example. In these or other methods, step (f) utilizes casting the polymer precursor mixture onto the substrate.

Generally, the polymer precursor mixture may be prepared and then deposited over an area of interest, which is the substrate. The substrate may have a large area, such as the scale of a vehicle or aircraft. Any known methods to deposit the polymer precursor mixture may be employed. The polymer precursor mixture may be applied to a surface using any coating technique, such as (but not limited to) spray coating, dip coating, doctor-blade coating, spin coating, air knife coating, curtain coating, single-layer or multilayer slide coating, gap coating, knife-over-roll coating, metering rod (Meyer bar) coating, reverse roll coating, rotary screen coating, extrusion coating, casting, or printing. The polymer precursor mixture may be rapidly sprayed or cast in thin layers over large areas (such as multiple square meters).

Moisture-labile imine groups are readily converted back to amine functional groups (i.e., unblocked) by water moisture, which serves as a reactant in the hydrolysis reaction. Hydrolysis may be passive, active, or a combination thereof.

For example, in some methods, step (g) passively utilizes environmental humidity for the hydrolysis of the multifunctional imine compound in the polymer precursor mixture on the substrate. Passive hydrolysis means that the polymer precursor mixture is exposed to the ordinary, ambient environment, which essentially always contains at least some humidity ($H_2O$ vapor in air). The moisture present in the environmental air is utilized for the hydrolysis of imine groups, to form unblocked amine groups. In these embodiments, the temperature in step (g) may be from about −20° C. to about 40° C., for example; the pressure in step (g) may be from about 0.8 bar to about 1.2 bar, for example; and the hydrolysis time in step (g) may be from about 1 minute to about 8 hours, for example.

In some methods, step (g) actively utilizes a source of humidity for the hydrolysis of the multifunctional imine compound in the polymer precursor mixture on the substrate. Active hydrolysis means that the polymer precursor mixture is exposed to a controlled amount or concentration of $H_2O$, in the form of vapor or liquid, to cause hydrolysis of imine groups, forming unblocked amine groups. In these embodiments, the temperature in step (g) may be from about 25° C. to about 150° C., for example; the pressure in step (g) may be from about 0.1 bar to about 5 bar, for example; and the hydrolysis time in step (g) may be from about 1 minute to about 8 hours, for example.

It is possible to perform steps (f) and (g) simultaneously, or at least with some overlap in time. For example, after step (e) to make a polymer precursor mixture, some amount of hydrolysis may be done—intentionally or unintentionally—before the polymer precursor mixture is applied to a substrate. Hydrolysis, whether passive or active, may start while the material is being deposited on the substrate. In certain embodiments, the hydrolysis is complete before the polymer precursor mixture is applied to the substrate. In certain embodiments, the hydrolysis is complete, and imine groups are all converted to amine groups, but the multifunctional amine compound has not yet reacted with the multifunctional ketone compound before applying the mixture to the substrate. Finally, in certain less-preferred embodiments, the hydrolysis is complete, imine groups are all converted to amine groups, and the multifunctional amine compound has fully reacted with the multifunctional ketone compound before applying the mixture to the substrate. In the latter case, the vitrimeric polymer network is fully formed, so its application onto the substrate may be more difficult compared to when the final chemistry in step (g) occurs after step (f).

The reaction conditions in step (g) are generally selected to ultimately form a vitrimeric polymer network, and one skilled in the chemistry art will be able to select the time, temperature, pressure, water concentration, and so on, or find optimum conditions with routine experimentation.

Step (g) may be conducted at various temperatures, such as from about 30° C. to about 200° C., e.g. about, at least about, or at most about 30° C., 40° C., 50° C., 60° C., 70° C., 80° C., 90° C., 100° C., 110° C., 120° C., 130° C., 140° C., 150° C., 160° C., 170° C., 180° C., 190° C., or 200° C., including any intervening range.

Step (g) may be conducted at various pressures, such as from about 0.1 bar to about 10 bar, e.g. about, at least about, or at most about 0.1 bar, 0.5 bar, 0.8 bar, 0.9 bar, 1.0 bar, 1.1 bar, 1.2 bar, 1.5 bar, 2 bar, 3 bar, 4 bar, 5 bar, or 10 bar, including any intervening range.

Step (g) may be conducted at various times, such as from about 10 minutes to about 12 hours, e.g. about, at least about, or at most about 0.1, 0.2, 0.3, 0.4, 0.5, 1, 1.5, 2, 2.5, 3, 4, 5, 6, 7, 8, 9, 10, 11, or 12 hours, including any intervening range.

Step (g) ordinarily does not employ agitation of the reactants, which are disposed on the substrate. However, the entire system containing the polymer precursor mixture on substrate may be agitated in some way that enhances mass transfer by diffusion or convection. Such agitation may be intentional, such as via rotation, vibration, or sonication; or may be passive, such as via movement of the substrate taking place anyway (e.g., a moving vehicle).

In some variations, at a later time and usually different place, the vitrimeric polymer network that had been made in step (g) is then intentionally depolymerized. In these variations, the method further comprises depolymerizing the vitrimeric polymer network, thereby generating recycled vitrimeric monomers. Depolymerizing is synonymous with digestion, in this specification. After depolymerizing, the vitrimeric polymer network is converted to monomers, oligomers, polymer fragments, or a combination thereof, as well as any additives or fillers that were present in the vitrimeric polymer network (additives and fillers generally do not react during depolymerization).

Depolymerizing may be carried out using exposure of the vitrimeric polymer network to an aqueous acid, such as (but not limited to) hydrochloric acid, sulfuric acid, or a combination thereof. Other acids, both inorganic and organic, may be employed for depolymerization; examples include para-toluenesulfonic acid, nitrous acid, acetic acid, and lactic acid. The acid may be an acid catalyst that is not consumed in the depolymerization reaction. Alternatively, the acid (or hydrogen derived from the acid) may be consumed to some extent in the depolymerization reaction. In some embodiments, water is a depolymerization reactant, while in other cases, water is not consumed but used to moderate the strength of the acid and/or serve as a reaction solvent. The depolymerization pH may be selected from about −2 to about 6, such as about, at least about, or at most about −2, −1, 0, 1, 2, 3, 4, 5, or 6, including any intervening range.

Alternatively, or additionally, depolymerizing is carried out using exposure of the vitrimeric polymer network to an organic solvent as the depolymerization solvent. The organic solvent may be selected from the group consisting of tetrahydrofuran, methyl ethyl ketone, methyl propyl ketone, methyl isobutyl ketone, acetone, diethyl ether, n-butyl acetate, toluene, benzene, xylenes, hexanes, methylene chloride, and combinations thereof. In some embodiments, the depolymerization solvent is inert but assists the reaction by dissolving the reactants and products, thereby removing diffusion limitations, for example. In some embodiments, the depolymerization solvent is itself inert (does not react and is not produced) but influences the chemistry (thermodynamics and/or kinetics) in what is known as the solvent effect. Solvents can have an effect on solubility, stability, and reaction rates. Different solvents can affect the equilibrium constant of a reaction by differential stabilization of a reactant or product. The equilibrium is shifted in the direction of the substance that is preferentially stabilized. Stabilization of the reactant or product can occur through non-covalent interactions with the solvent such as H-bonding, dipole-dipole interactions, or van der Waals interactions. In certain embodiments, the solvent itself is reactive in the depolymerization and may be consumed to some extent.

Alternatively, or additionally, depolymerizing is carried out using exposure of the vitrimeric polymer network to an elevated temperature, such as from about 30° C. to about 200° C., from about 40° C. to about 100° C., or from about 40° C. to about 70° C. In various embodiments, the elevated temperature for depolymerization is about, at least about, or at most about 30° C., 40° C., 50° C., 60° C., 70° C., 80° C., 90° C., 100° C., 110° C., 120° C., 130° C., 140° C., 150° C., 160° C., 170° C., 180° C., 190° C., or 200° C., including any intervening range.

Various combinations of means for depolymerization may be used. In some embodiments, depolymerizing is carried out using exposure of the vitrimeric polymer network to an aqueous acid as well as to an organic solvent. In these embodiments, the aqueous acid may be hydrochloric acid, sulfuric acid, or a combination thereof, and the organic solvent may be tetrahydrofuran, methyl ethyl ketone, methyl propyl ketone, methyl isobutyl ketone, acetone, diethyl ether, n-butyl acetate, toluene, benzene, xylenes, hexanes, methylene chloride, or a combination thereof.

In some embodiments, depolymerizing is carried out using exposure of the vitrimeric polymer network to an aqueous acid as well as to an elevated temperature. In these embodiments, the aqueous acid may be hydrochloric acid, sulfuric acid, or a combination thereof, and the elevated temperature may be about, at least about, or at most about 30° C., 40° C., 50° C., 60° C., 70° C., 80° C., 90° C., 100° C., 110° C., 120° C., 130° C., 140° C., 150° C., 160° C., 170° C., 180° C., 190° C., or 200° C., including any intervening range. In certain embodiments, depolymerization is not effective with hydrochloric acid and/or sulfuric acid at a temperature of only 25° C., i.e. an elevated temperature is necessary.

In some embodiments, depolymerizing is carried out using exposure of the vitrimeric polymer network to an aqueous acid, an organic solvent, and an elevated temperature. In these embodiments, the aqueous acid may be hydrochloric acid, sulfuric acid, or a combination thereof; the organic solvent may be tetrahydrofuran, methyl ethyl ketone, methyl propyl ketone, methyl isobutyl ketone, acetone, diethyl ether, n-butyl acetate, toluene, benzene, xylenes, hexanes, methylene chloride, or a combination thereof; and the elevated temperature may be about, at least about, or at most about 30° C., 40° C., 50° C., 60° C., 70° C., 80° C., 90° C., 100° C., 110° C., 120° C., 130° C., 140° C., 150° C., 160° C., 170° C., 180° C., 190° C., or 200° C., including any intervening range.

The time for depolymerization will generally depend on the choice of acid, the choice of solvent (if any), and temperature. In various embodiments, the time for depolymerization is from about 1 minute to about 24 hours, such as from about 10 minutes to about 4 hours, e.g. about, at least about, or at most about 0.1, 0.2, 0.3, 0.4, 0.5, 1, 2, 3, 4, 5, 6, 7, 8, 9, 10, 11, 12, 18, or 24 hours, including any intervening range.

The recycled vitrimeric monomers may form some or all of the multifunctional ketone compound in step (a). Steps (a) to (g) may be repeated multiple times in a closed loop. The number of loops is arbitrary, such as from 1 to 1000.

The vitrimeric polymer network may alternatively, or additionally, be repaired rather than depolymerized. In these embodiments, when the vitrimeric polymer network needs to be repaired, or for preventative treatment, the vitrimeric polymer network may be subjected to an elevated temperature for purposes of breaking and (re)forming bonds. An elevated temperature causes rearrangement of dynamic bonds in the polymer backbone. The process of rearranging dynamic bonds in the polymer backbone allows the processing of the vitrimeric polymer network in a manner that maintains or improves one or more properties. Those properties are typically mechanical properties (e.g., compressive strength) but could alternatively, or additionally, be chemical, thermal, electrical, or magnetic properties, for example. The process of rearranging dynamic bonds may be referred to as repairing, healing, reworking, rebonding, and/or rearranging the thermoset vitrimer. Such processing can even remove defects, analogous to how classical materials such as metals can be (re)processed.

The relaxation dynamics of vitrimers are characterized by two distinct transition temperatures: the conventional glass-transition temperature $T_g$ and a topology-freezing transition temperature $T_v$ at which the bond-switching rate (for rearrangement of dynamic bonds) becomes immeasurably slow. $T_g$ is the usual temperature of transition between the glassy and rubbery state of a polymer network, correlated to the onset of long-range, coordinated molecular motion. $T_v$ is a transition temperature that depends on the network crosslink exchange reactions. When the time scale of bond-exchange reactions becomes shorter than the time scale of material deformation, the network can rearrange its topology, resulting in flow. Hence, a transition from viscoelastic solid to viscoelastic liquid occurs at $T_v$. The topology-freezing transition may be the temperature corresponding to a viscosity of $10^{12}$ Pa·s. $T_v$ may also be observed experimentally by dilatometry, since a reorganizing network has a higher expansion coefficient than a static network. See Yang et al., "Detecting topology freezing transition temperature of vitrimers by AIE luminogens", *NATURE COMMUNICATIONS* 10:3165 (2019), which is hereby incorporated by reference for measurement and estimation of $T_v$ for vitrimers, in some embodiments.

$T_g$ and $T_v$ may be controlled by adjusting parameters such as the crosslink density, intrinsic rigidity of monomers, and/or the density of exchangeable bonds and groups. For most applications, vitrimers preferably behave like classical thermosetting polymer networks in a useful temperature window, i.e. without significant creep. Only when heated, the network reorganization becomes significant, resulting in a controlled macroscopic flow without risking structural damage.

$T_v$ may be lower than, higher than, or about the same as $T_g$, in various embodiments. When $T_g<T_v$, upon heating from a temperature below $T_g$ to a temperature between $T_g$ and $T_v$, the glassy solid will first undergo a transition to the rubbery state and will behave as an elastomer since the exchange reactions are so slow that the network structure is essentially fixed. On further heating, the exchange reactions speed up and become relevant at temperatures above $T_v$, transforming the vitrimer to a viscoelastic liquid with flow mainly controlled by the crosslink exchange kinetics, and typically with typical Arrhenius-law viscosity decrease. When $T_g>T_v$, intrinsically fast exchange reactions are embedded in a rigid polymer matrix, and upon heating, the vitrimer undergoes a topology-freezing transition before a glass transition. The network is not necessarily frozen by the reaction kinetics, but by the lack of segmental motions associated with $T_g$. At temperatures below $T_g$, no segmental motion occurs; consequently, no exchange reactions can occur and the network is diffusion-controlled. Upon heating above $T_g$, segmental motion is gradually initiated while the exchange reactions are already fast (in cases for which $T_g>T_v$). Network rearrangement kinetics are diffusion-controlled and network topology rearrangements are dominated by segmental motions, resulting in Williams-Landel-Ferry viscosity behavior. With further heating, the exchange kinetics transition from a diffusion-controlled regime to an exchange reaction-controlled regime, which then follows the Arrhenius law. When $T_g=T_v$ (or $T_g \approx T_v$), the situation is intermediate between the two cases described in this paragraph. In particular, the vitrimer undergoes both a glass transition along with a topology-freezing transition, generating a viscoelastic liquid with flow mainly controlled by the crosslink exchange kinetics in an exchange reaction-controlled regime.

The $T_g$ of the vitrimeric polymer network may vary, such as from about 0° C. to about 200° C. In some embodiments, $T_g$ is less than room temperature (25° C.). In other embodiments, $T_g$ is room temperature or greater. In various embodiments, $T_g$ is about, at least about, or at most about 0° C., 10° C., 20° C., 25° C., 30° C., 40° C., 50° C., 60° C., 70° C., 80° C., 90° C., 100° C., 110° C., 120° C., 130° C., 140° C., 150° C., 160° C., 170° C., 180° C., 190° C., or 200° C., including any intervening ranges.

The $T_v$ of the vitrimeric polymer network may vary, such as from about 25° C. to about 250° C. In some embodiments, $T_v$ is about 50° C. or greater, such as about 100° C. or greater. In various embodiments, $T_v$ is about, at least about, or at most about 20° C., 25° C., 30° C., 40° C., 50° C., 60° C., 70° C., 80° C., 90° C., 100° C., 110° C., 120° C., 130° C., 140° C., 150° C., 160° C., 170° C., 180° C., 190° C., 200° C., 210° C., 220° C., 230° C., 240° C., or 250° C., including any intervening ranges.

The difference between topology-freezing transition temperature and glass-transition temperature ($T_v-T_g$) of the vitrimeric polymer network may vary, such as from about 25 to about 100 degrees Celsius. In various embodiments, the difference ($T_v-T_g$) is about, at least about, or at most about −50, −40, −30, −25, −20, −15, −10, −5, 0, 5, 10, 15, 20, 25, 30, 40, 50, 60, 70, 80, 90, or 100 degrees Celsius, including any intervening ranges.

When $T_v>T_g$, the temperature at which the vitrimeric polymer network is processed for repair is preferably at least $T_v$. The repair temperature may exceed $T_v$ by about 2, 5, 10, 15, 20, 25, 30, 40, 50 degrees Celsius, or more, for example. In one example, $T_v$ is about 100° C. and the repair temperature is about 120° C.

When $T_v<T_g$, the temperature at which the vitrimeric polymer network is processed for repair is preferably at least $T_v$, more preferably between $T_v$ and $T_g$, and most preferably at least $T_g$, for the specific thermoset vitrimer. The repair temperature may exceed $T_v$ by about 10, 20, 30, 40, 50, 60, 70, 80, 90, or 100 degrees Celsius, or more, for example. The repair temperature may exceed $T_g$ by about 2, 5, 10, 20, 30, 40, or 50 degrees Celsius, or more, for example.

In some embodiments, the repair temperature is about 50° C. or greater, such as about 100° C. or greater. In various embodiments, the repair temperature is about, at least about, or at most about 50° C., 60° C., 70° C., 80° C., 90° C., 100° C., 110° C., 120° C., 130° C., 140° C., 150° C., 160° C., 170° C., 180° C., 190° C., or 200° C., including any intervening ranges (e.g., a repair temperature of about 100-120° C.). Multiple repair temperatures may be utilized, such as in a thermal ramp for healing the vitrimeric polymer network, allowing for sufficient repair time at each selected healing temperature.

The "repair time" is the time for which the vitrimeric polymer network is held at a given temperature in order to return the vitrimer back to an initial state and/or to a predetermined state. For example, the predetermined state may be 50%, 90%, or 100% of the original compressive strength of the vitrimeric polymer network. The repair time will generally be dictated by the repair temperature and pressure for a given vitrimeric polymer network. In some embodiments, the repair time is from about 10 seconds to about 10 minutes. In certain embodiments, the repair time is from about 30 seconds to about 5 minutes. In various embodiments, the repair time is about, at least about, or at most about 5 seconds, 10 seconds, 20 seconds, 30 seconds, 1 minute, 2 minutes, 3 minutes, 4 minutes, 5 minutes, 6 minutes, 7 minutes, 8 minutes, 9 minutes, 10 minutes, 15 minutes, 20 minutes, or 30 minutes, including any intervening ranges. As noted above, when a thermal ramp is employed, each repair temperature will have an effective repair time.

Generally speaking, the vitrimeric polymer network does not melt but rather undergoes decomposition at very high temperatures, such as about 300° C. or higher. The repair temperature and repair time need to be selected to avoid thermal decomposition of the vitrimeric polymer network. Preferably, the repair temperature is lower than the decomposition temperature of the vitrimeric polymer network, which is the temperature at which degradation reactions are kinetically faster than the desired dynamic exchange reactions. In addition to temperature, other reaction conditions may play a role in the desired associative dynamic exchange versus the undesired decomposition-such as time, pressure, pH, and catalysts. At a given repair temperature, even slow decomposition may become significant if the repair time is too long.

In some embodiments, the quality of the repair may be assessed by the degree of conservation of crosslink density following the repair process. The reason for this performance metric is that, in principle, purely associative dynamic bonding conserves crosslink density during rearrangement chemical reactions. The net number of bonds remains the same. By contrast, non-selective chemistry does not conserve crosslink density when there are decomposition reactions and/or dissociative dynamic covalent bond breakage with incomplete reformation of those bonds. In some embodiments, the associative dynamic bonding completely conserves crosslink density during rearrangement chemical reactions, which means the final crosslink density after repair is 100% of the initial crosslink density in the thermoset vitrimer. In some embodiments, the crosslink density after repair is from about 80% to 100% of the initial crosslink density in the vitrimeric polymer network. In various embodiments, the crosslink density after repair is about, or at least about 50%, 60%, 70%, 80%, 90%, 95%, 99%, 99.5%, 99.9%, or 100% of the initial crosslink density in the vitrimeric polymer network. In other embodiments, crosslink density is dramatically reduced if a monofunctional amine is used.

EXAMPLES

Materials.

5,5-dimethyl-1,3-cyclohexanedione (dimedone), sebacic acid, N,N'-dicyclohexylcarbodiimide (DCC), 4-dimethylaminopyridine (DMAP), dichloromethane (CH$_2$Cl$_2$), hydrochloric acid (HCl), magnesium sulfate, ethyl acetate, and triethylenetetramine (TETA) are purchased from Sigma-Aldrich, Inc. (St. Louis, Missouri, USA) and used as received. Methyl isobutyl ketone (MIBK) is purchased from Sigma-Aldrich, Inc. and dried over 4 Å sieves prior to use. Hexatran® (product Hexatran-100) is purchased from Ascend Performance Materials (Houston, Texas, USA). Hexatran is 4-(aminomethyl)octane-1,8-diamine. Epon™ Resin 828, a difunctional bisphenol A/epichlorohydrin-derived liquid epoxy resin, is obtained from Miller-Stephenson, Inc. (Danbury, Connecticut, USA).

Example 1: Synthesis of Sebacic Acid-Based Multifunctional Triketone Dimer as Diketoenamine Precursor Sebacic acid (1.0 eq.), dimedone (2.1 eq.), and N,N-dimethyl-4-amino pyridine (3.0 eq.) are dissolved in dichloromethane (14.0 eq.) and labeled solution A. In a separate container, dicyclohexylcarbodiimide (2.4 eq.) is dissolved in dichloromethane (16.0 eq.) and labeled solution B. Solution B is added dropwise to solution A with vigorous stirring at room temperature (about 25° C.) in a reaction vessel. The reaction vessel is stirred at ambient conditions for 4 hours.

After the reaction, the reaction solution is gravity-filtered through filter paper. Solids are washed with additional dichloromethane until the solids are completely white. The reaction solution is then washed with 1 M hydrochloric acid until the aqueous layer has pH<3 according to pH paper or a pH meter. Organics are then dried over magnesium sulfate for at least 5 minutes to ensure a fully dried product. Solvent is removed by rotary evaporation and, if necessary, high vacuum. The crude product is then recrystallized in ethyl acetate in a ratio of 1.5 mL of ethyl acetate per gram of crude product. The recrystallized material is then heated to 55° C. in a water bath until all solids fully dissolve, then refrigerated at 5° C. overnight. The resulting crystal mat is broken up and vacuum-filtered to remove all traces of excess solvent, thereby generating the diketoenamine precursor.

The structure of the diketoenamine precursor (multifunctional triketone dimer) is

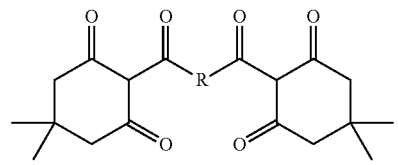

which is a generic structure, with R=C$_8$ alkyl chain in this Example 1 (sebacic acid is OOOC(CH$_2$)$_8$COOH). This compound may be referred to as "TK-10". The two ketone groups closest to R are reacted with primary amines to form two diketoenamine linkages capable of vitrimeric exchange and acidic reversion.

Example 2: Synthesis of MIBK-Blocked Hexatran

A Variac® transformer with a heating mantle on a stir plate is set up with a coolant circulator and 50/50 (volume basis) water/isopropanol mixture is added as a coolant mixture. Hexatran and MIBK (3 molar excess with respect to amine groups) are added to a round-bottomed flask along with a magnetic stir bar. The headspace in the flask was reduced to only 10-20% of the total flask volume for improved reflux and conversion speed. A Dean-Stark trap and condenser is installed above the round-bottomed flask. Nitrogen is introduced at the top of the condenser using either a T-joint or a rubber septum with needles and flushed with nitrogen for 10 minutes. The cooling circulator is turned on and heating is initiated with a thermocontroller. The reaction is monitored and water periodically drained from the Dean-Stark trap, noting how much water has been collected. Water collection can take upwards of 48 hours to drive to near completion. When at least 90-95% of water is collected, the Dean-Stark trap is opened to begin to remove the excess MIBK. The MIBK-blocked Hexatran is stored under N$_2$ in a polyethylene container. The yield is determined to be about 90%, as measured through titration on an equivalent-weight basis. The MIBK-blocked Hexatran is a multifunctional imine compound, wherein imine groups block amine groups.

The chemical structure of MIBK-blocked Hexatran is shown below. This multifunctional imine compound contains three imine groups, each blocking an amine group. The MIBK-blocked Hexatran is capable of slow reaction through atmospheric moisture following casting or spraying.

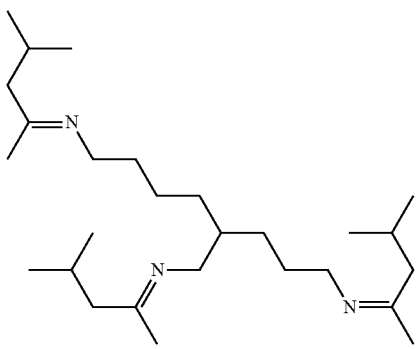

The Example 2 overcomes aforementioned limitations of Helms. The Hexatran monomer species is modified to block the reactive amine groups, by generating imine groups. Specifically, methyl isobutyl ketone is introduced as a protecting group onto the amines of Hexatran through refluxing of a Hexatran and MIBK solution with simultaneous removal of water generated in the reaction. An important benefit is creation of a monomer species that does not react when combined with a triketone species. Yet, upon casting or spraying of the mixture and exposure to atmospheric moisture, the imine group reverts to the original ketone (MIBK) and primary amine. This provides an elegant way to generate reactive primary amines in situ for prompt reaction with multifunctional triketones after deposition, since spraying or casting are convenient methods of applying the mixture.

Example 3: Synthesis of Solution-Castable/Sprayable Network with MIBK-Blocked Hexatran The diketoenamine precursor of Example 1 is weighed (2.0 g) into a vial and dissolved into 12 g of dry MIBK using mild heating to completely dissolve all solids. The MIBK-blocked Hexatran of Example 2 is then added (1.26 g) to the solution, stirred, and left to sit overnight while capped and protected from moisture. The mixture is then cast into a polytetrafluoroethylene tray (3 inch×3 inch) and the solvent is allowed to evaporate for 24 hr. The film is then heated in a 120° C. oven for 1 hr before removal. The resulting film is a cast vitrimeric poly(diketoenamine) network.

Example 4: Synthesis of Solution-Castable/Sprayable Network with TETA

The diketoenamine precursor of Example 1 is weighed (500 mg, equivalent weight 211.5 g/mol, 0.74 mmoles) in a vial and dissolved in 2 mL of $CH_2Cl_2$. To this mixture is added TETA at 90 mol % with respect to the terminal primary amines (48.9 mg, equivalent weight 73 g/mol, 0.67 mmoles) and the mixture is allowed to stir for 1 hr. Epon 828 (126 mg, equivalent weight 188 g/mol, 0.67 mmoles) is then added and the solution is cast into a polytetrafluoroethylene tray (3 inch×3 inch). The solvent is evaporated and the film is heated to cure fully (25° C., 24 hr) before removing. The resulting film is a cast vitrimeric poly(diketoenamine) network.

Example 5: Depolymerization of Vitrimeric Polymer Network

The cast vitrimeric polymer network of Example 3 is evaluated for its capability of depolymerization of the poly (diketoenamine) network.

Thin-film samples of the poly(diketoenamine) network are created using a blue pigment. One strip of the thin film is placed in a 6 M HCl solution. Another strip of the thin film is placed in a 6 M HCl solution composed of a 50/50 (volume basis) mixture of $H_2O$ and tetrahydrofuran (THF). The solutions are stirred over a period of 20 hr at room temperature (about 25° C.).

Figure 1B:
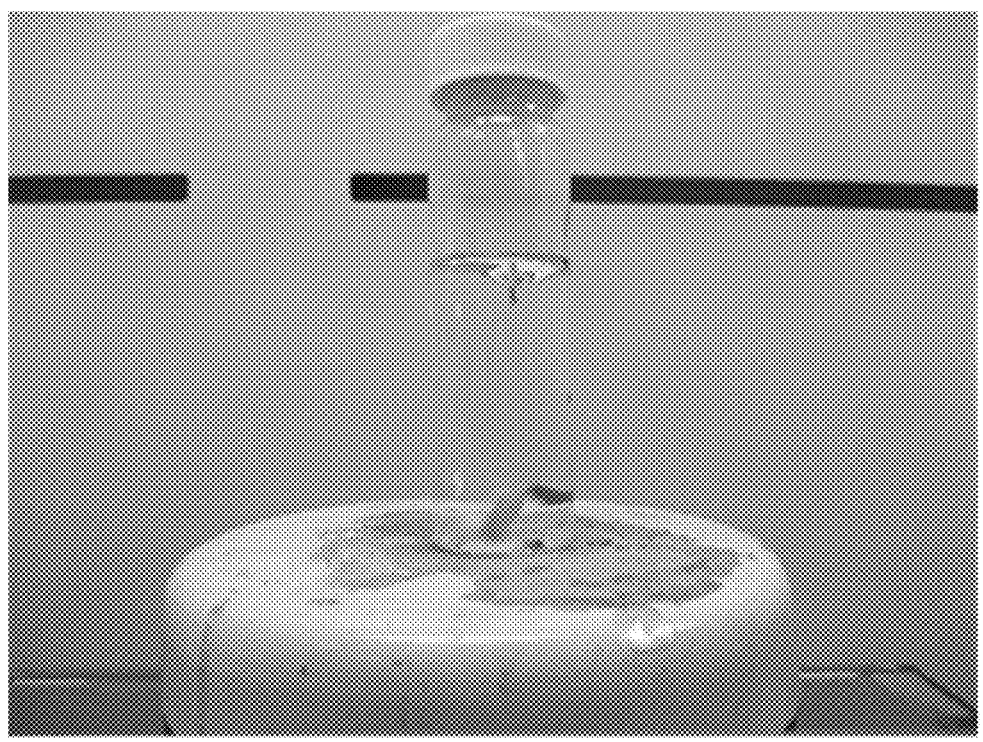
FIG. 1B shows a time-lapse photographic image of a polymeric network composed of Hexatran and TK-10 triketone dimer in pure aqueous acid (6 M HCl), after 3 hours, in Example 5.
Figure 1C:
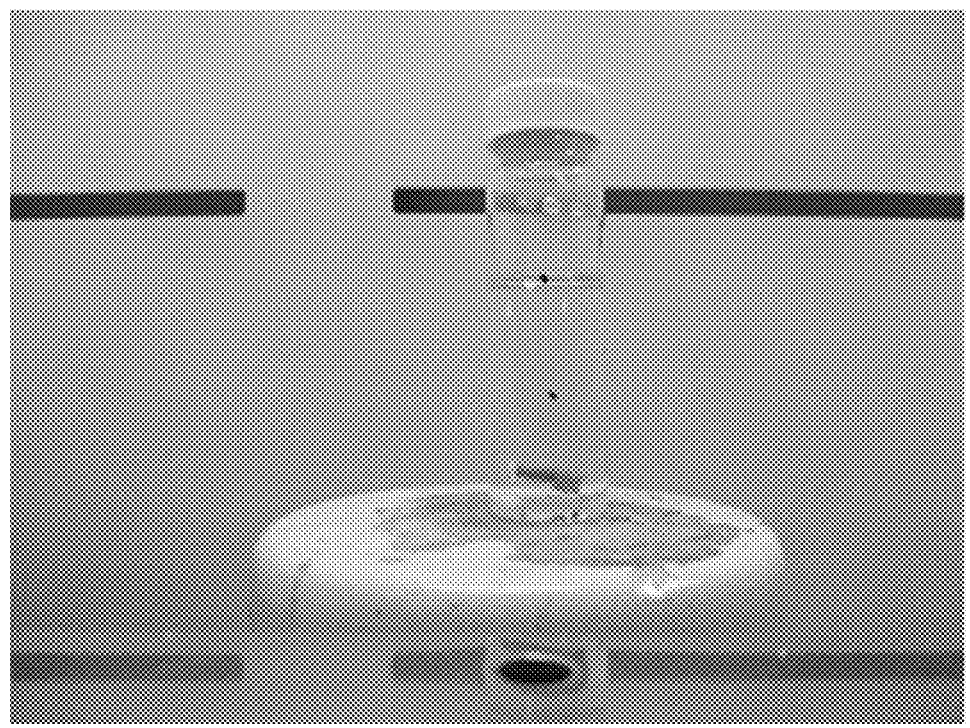
FIG. 1C shows a time-lapse photographic image of a polymeric network composed of Hexatran and TK-10 triketone dimer in pure aqueous acid (6 M HCl), after 20 hours, in Example 5.
Figure 2A:
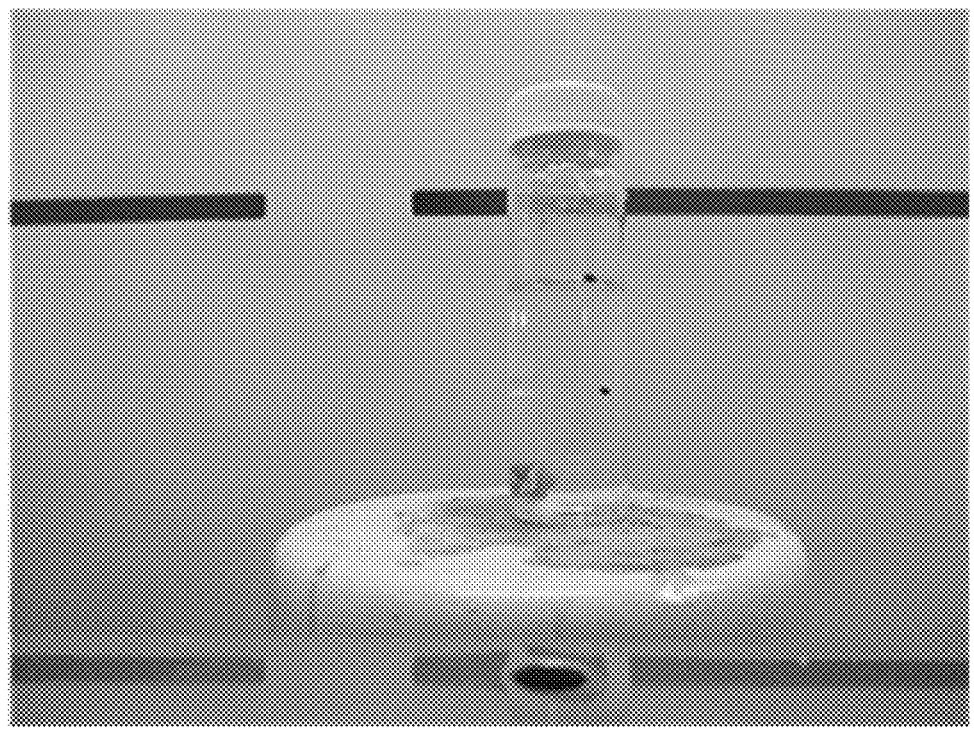
FIG. 2A shows a time-lapse photographic image of a polymeric network composed of Hexatran and TK-10 triketone dimer in mixed organic solvent/aqueous acid solution of 6 M HCl and $H_2O$/THF, at time 0, in Example 5.
Figure 2B:
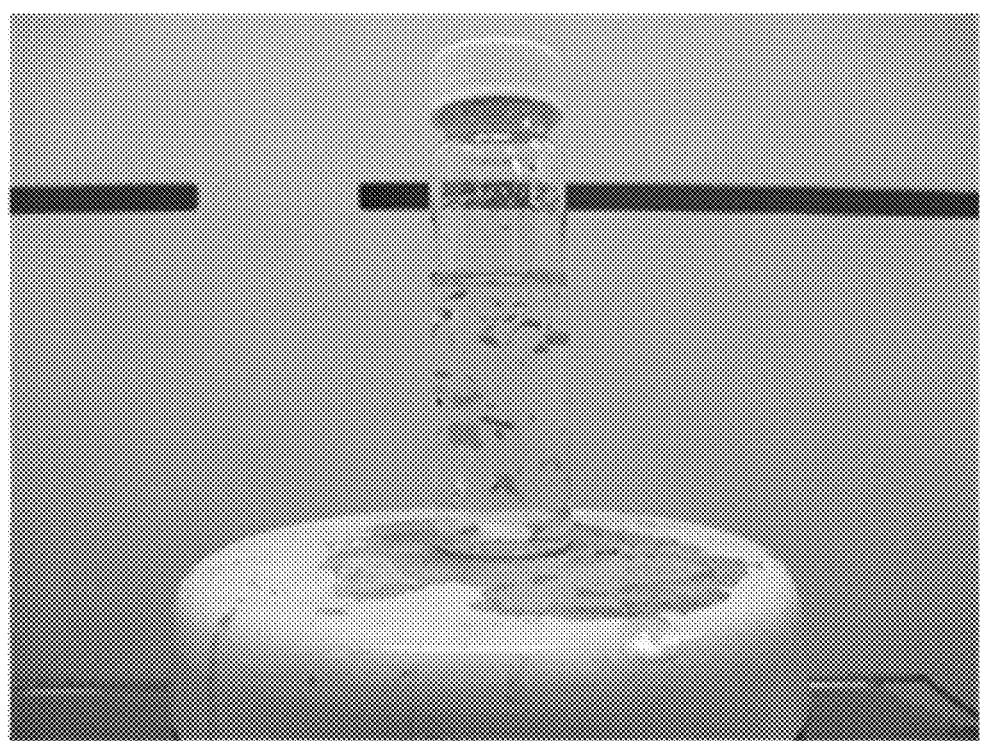
FIG. 2B shows a time-lapse photographic image of a polymeric network composed of Hexatran and TK-10 triketone dimer in mixed organic solvent/aqueous acid solution of 6 M HCl and $H_2O$/THF, after 3 hours, in Example 5.
Figure 2C:
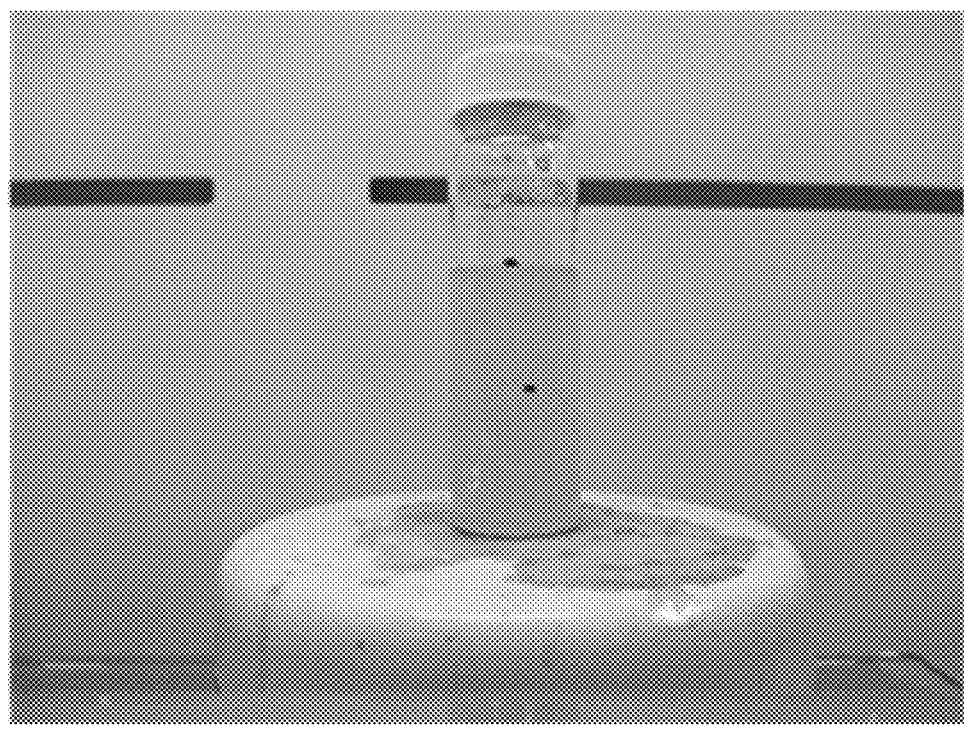
FIG. 2C shows a time-lapse photographic image of a polymeric network composed of Hexatran and TK-10 triketone dimer in mixed organic solvent/aqueous acid solution of 6 M HCl and $H_2O$/THF, after 20 hours, in Example 5.
Figure 2D:
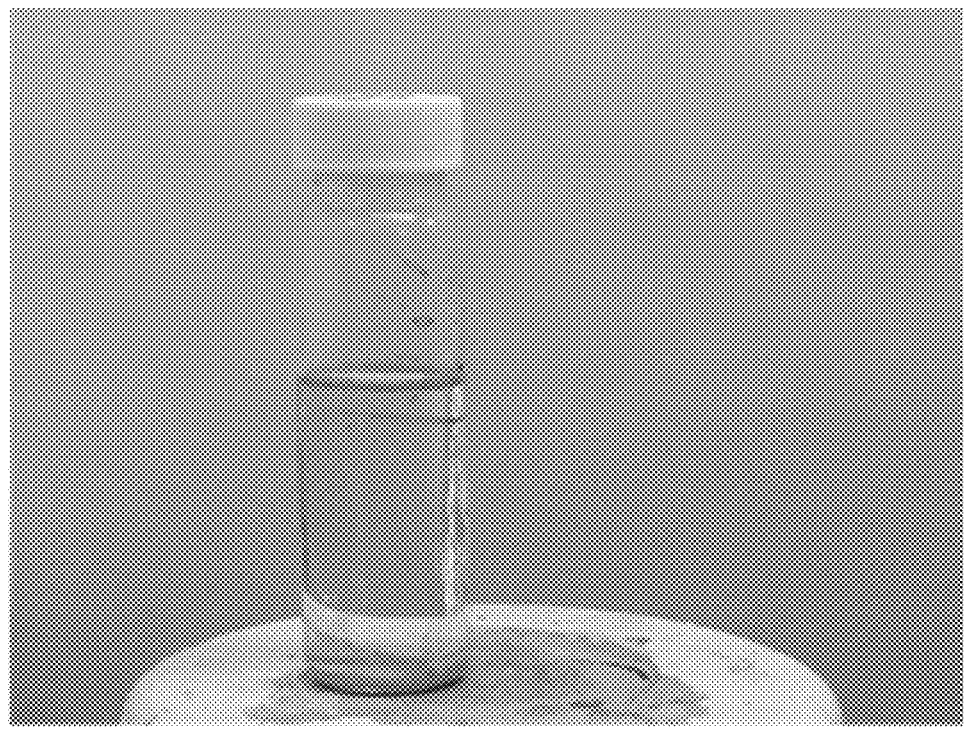
FIG. 2D shows the polymeric network in mixed organic solvent/aqueous acid solution after pigment sedimentation, demonstrating facile separation in Example 5.

FIGS. 1A, 1B, 1C, 2A, 2B, 2C, and 2D show time-lapse photographic images of a blue-pigmented strip of poly (diketoenamine) network composed of Hexatran and sebacic acid-based multifunctional triketone (Example 1). FIGS. 1A, 1B, and 1C show the blue-pigmented strip of poly (diketoenamine) network composed of Hexatran and sebacic acid-based multifunctional triketone (Example 1) in pure aqueous acid (6 M HCl) at the initial time (FIG. 1A), after 3 hours (FIG. 1), and after 20 hours (FIG. 1C). FIGS. 2A, 2B, and 2C show the blue-pigmented strip of poly(diketoenamine) network composed of Hexatran and sebacic acid-based multifunctional triketone (Example 1) in mixed organic solvent/aqueous acid solution of 6 M HCl and $H_2O$/THF at the initial time (FIG. 2A), after 3 hours (FIG. 2B), and after 20 hours (FIG. 2C). FIG. 2D shows the depolymerized network in mixed organic solvent/aqueous acid solution after pigment sedimentation, demonstrating facile separation.

FIGS. 1B and 1C demonstrate the ability of the Hexatran-based poly(diketoenamine) films to resist degradation in the purely water-based acidic medium. FIGS. 2B and 2C demonstrate that the mixed organic solvent and aqueous solution is more effective at penetrating the network and promoting depolymerization. This greater selectivity in depolymerization conditions is attractive because it reduces the likelihood of encountering similar conditions that would be capable of triggering breakdown in an operational environment.

Additionally it has been discovered that temperature is another selective parameter for depolymerization of the Hexatran-based poly(diketoenamine) network. Samples are placed in a purely aqueous 6 M HCl solution (no organic solvent) and taken up to an elevated temperature of 70° C. Depolymerization is visually observed at about 6 hours. While the room-temperature exposure to these conditions maintains the integrity of the original film (as shown in FIGS. 1B and 1C), elevated temperatures promote polymer breakdown after only several hours.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A vitrimeric-polymer packaged composition comprising:
   (a) a multifunctional triketone dimer;
   (b) a multifunctional imine compound, wherein imine functional groups block amine functional groups;
   (c) optionally, an amine-reactive compound; and
   (d) optionally, one or more additives or fillers.

2. The vitrimeric-polymer packaged composition of claim 1, wherein all components are separated within a package.

3. The vitrimeric-polymer packaged composition of claim 1, wherein all components are blended together within a package.

4. The vitrimeric-polymer packaged composition of claim 1, wherein said multifunctional triketone dimer has the structure:

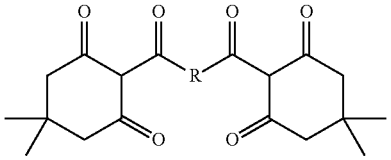

wherein R contains from 1 to 50 carbon atoms;
wherein R is a linear hydrocarbon group, a branched hydrocarbon group, a cyclic hydrocarbon group, or a combination thereof; and
wherein R contains carbon-carbon single bonds, carbon-carbon aromatic bonds, carbon-carbon double bonds, carbon-carbon triple bonds, or a combination thereof.

5. The vitrimeric-polymer packaged composition of claim 4, wherein said R is a linear hydrocarbon group, and wherein R contains from 4 to 12 carbon atoms.

6. The vitrimeric-polymer packaged composition of claim 4, wherein said R is selected from benzene, naphthalene, or anthracene.

7. The vitrimeric-polymer packaged composition of claim 4, wherein said R is a branched hydrocarbon group.

8. The vitrimeric-polymer packaged composition of claim 1, wherein said multifunctional imine compound does not contain a tertiary amine group.

9. The vitrimeric-polymer packaged composition of claim 1, wherein said imine functional group blocks amine functional groups contained in the following structure:

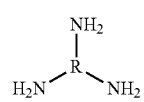

wherein R contains from 1 to 20 carbon atoms;
wherein R is a linear hydrocarbon group, a branched hydrocarbon group, a cyclic hydrocarbon group, or a combination thereof, and
wherein R contains carbon-carbon single bonds, carbon-carbon aromatic bonds, carbon-carbon double bonds, carbon-carbon triple bonds, or a combination thereof.

10. The vitrimeric-polymer packaged composition of claim 9, wherein said multifunctional imine compound is MIBK-blocked 4-(aminomethyl)octane-1,8-diamine:

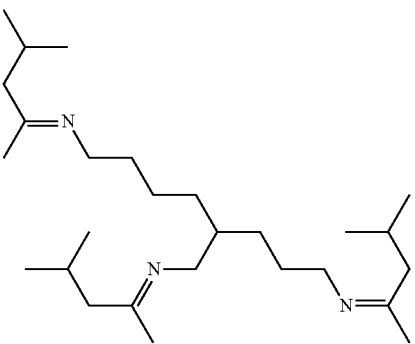 [SMILES: C/C(CC(C)C)=N/CCCC(CCCC/N=C(\C)CC(C)C)C/N=C(\C)CC(C)C]

* * * * *